United States Patent [19]
Ozaki et al.

[11] Patent Number: 4,944,376
[45] Date of Patent: Jul. 31, 1990

[54] BRAKE BAND DRUM FOR PLANETARY GEAR-TYPE TRANSMISSIONS

[75] Inventors: Kazuhisa Ozaki; Masakatsu Miura, both of Anjo, Japan

[73] Assignee: Aisin-Warner Kabushiki Kaisha, Anjo, Japan

[21] Appl. No.: 167,279

[22] Filed: Mar. 11, 1988

[30] Foreign Application Priority Data

May 2, 1987 [JP] Japan .................. 62-109181

[51] Int. Cl.$^5$ .................. F16D 67/04; F16D 25/063
[52] U.S. Cl. .................. 192/17 A; 192/85 AA
[58] Field of Search .......... 192/85 AA, 17 R, 17 A; 74/759, 761, 763, 767, 769

[56] References Cited

U.S. PATENT DOCUMENTS

| | | | |
|---|---|---|---|
| 2,584,469 | 2/1952 | Kelbel | 74/763 |
| 2,800,036 | 7/1957 | Miller | 74/763 |
| 4,080,848 | 3/1978 | Smirl | 74/759 |
| 4,098,378 | 7/1978 | Helmer | 192/17 A |
| 4,237,749 | 12/1980 | Koivunen | 74/763 |

FOREIGN PATENT DOCUMENTS

| | | | |
|---|---|---|---|
| 462346 | 3/1951 | Italy | 74/763 |
| 61-38227 | 2/1986 | Japan | 192/85 AA |

Primary Examiner—Rodney H. Bonck
Attorney, Agent, or Firm—Varndell Legal Group

[57] ABSTRACT

A brake band drum for a planetary gear-type automatic transmission in which a clutch is formed inside a press-manufactured planetary gear input member coupled to a press-manufactured clutch cylinder and one member of a planetary gear mechanism, and a band brake is arranged on the outer peripheral side of the clutch cylinder or planetary gear input member, characterized in that the clutch cylinder or planetary gear input member is fitted by being splined, and an engaging surface of the band brake is formed on an outer peripheral surface of the clutch cylinder or planetary gear input member. Thus, the brake band drum is formed by fitting the brake band drum and clutch cylinder together. This makes it possible to dispense with electron beam welding. As a result, costs and weight can be reduced.

3 Claims, 4 Drawing Sheets

BRAKE BAND DRUM FOR PLANETARY GEAR-TYPE TRANSMISSIONS

BACKGROUND OF THE INVENTION

This invention relates to the structure of a drum for a brake band for stopping the rotation of one member of a planetary gear in a planetary gear-type transmission.

FIGS. 4(a) and 4(b) illustrate the structure of a direct clutch and second coast brake in a conventional planetary gear-type transmission, in which FIG. 4(a) is a sectional view and FIG. 4(b) a perspective view of a clutch cylinder.

A planetary gear mechanism 3 is arranged about an intermediate shaft 2 coupled to an input shaft 1 for engine power. The planetary gear mechanism 3 includes a sun gear S fitted onto the outer periphery of the intermediate shaft 2, a ring gear R, and a carrier C supporting a pinion P meshing with these gears. The carrier CR is fitted on the outer periphery of the intermediate shaft 2.

The ring gear R is connected to a clutch cylinder 5 fitted on the input shaft 1, and the ring gear R and clutch cylinder 5 are engaged and disengaged by a piston 6. The clutch cylinder 5 is connected to a clutch cylinder 8 via a clutch 7, and the two clutches 5, 8 are engaged and disengaged by a piston 9. A band drum 10 is fixed to the outer periphery of the clutch cylinder 8 by electron beam welding. The band drum 10 is splined to a sun gear input drum 11 and secured to the sun gear S. By operating a band brake 12 arranged on the outer periphery of the band drum 10, stopping of the band drum 10 is controlled to halt rotation of the sun gear S.

As shown in (b) of FIG. 4, the clutch cylinder 8 is formed to include recesses 13 and protuberances 14 by pressing work. A clutch frictional engagement plate 15 is splined in each protuberance 14. Therefore, when the band brake 12 is tightened on the recesses 13 and protuberances 14, the band is damaged. Consequently, the band drum 10 is fixed to the outer periphery of the clutch cylinder 8 by electron beam welding and the band brake 12 is tightened along the flat outer periphery of the band drum 10.

However, in the above-described conventional structure of the brake band drum, welding means as for electron beam welding are required in order to fix the band drum 10 on the outer periphery of the clutch cylinder 8. A problem that arises as a result is higher cost. In addition, since welding distortion is brought about by the welding operation, another problem is that the piston sliding surface of the clutch cylinder 8 on the inner peripheral side must be machined after welding. A further drawback is that the surface of the welded joint is required to be finished and press-fitted in advance by machining.

Moreover, since the band drum 10 is large in diameter and generally comprises a drum made of steel, the drum is very heavy. Such a drum offers problems in terms of being installed in a light-weight automotive vehicle. Owing to the great weight of the band drum, the load-bearing capacity of the bearings arranged on the inner periphery of the clutch cylinder 8 is high, thereby resulting in reduced bearing durability.

SUMMARY OF THE INVENTION

An object of the present invention is to provide a brake band drum for a planetary gear-type transmission, in which welding means as for electron beam welding are not required, the band drum can be made light in weight and costs can be reduced.

According to the present invention, the foregoing object is attained by providing a brake band drum for a planetary gear-type automatic transmission in which a clutch is formed inside a press-manufactured planetary gear input member coupled to a press-manufactured clutch cylinder and one member of a planetary gear mechanism, and a band brake is arranged on the outer peripheral side of the clutch cylinder or planetary gear input member, characterized in that the clutch cylinder or planetary gear input member is fitted by being splined, and an engaging surface of the band brake is formed on an outer peripheral surface of the clutch cylinder or planetary gear input member.

Thus, in accordance with the invention, the brake band drum is formed by fitting the brake band drum and clutch cylinder together. This makes it possible to dispense with electron beam welding and reduce cost. Since there is no distortion caused by welding, piston operating irregularity due to distortion is eliminated and machining for preventing such operating irregularity is unnecessary. The entirety of the clutch cylinder is formed from a thin plate to lower cost further and reduce weight. Since a special drum for the brake band is unnecessary, an even greater reduction in weight and cost can be achieved.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1A:
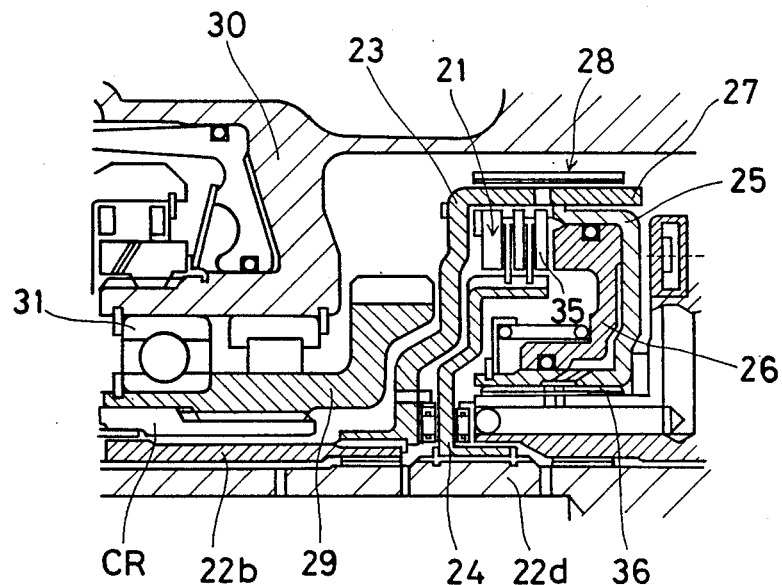
FIG. 1(a) and (b) illustrate a first embodiment of a brake band drum for a planetary gear-type transmission according to the present invention, in which (a) is a sectional view and (b) a perspective view.
Figure 1B:
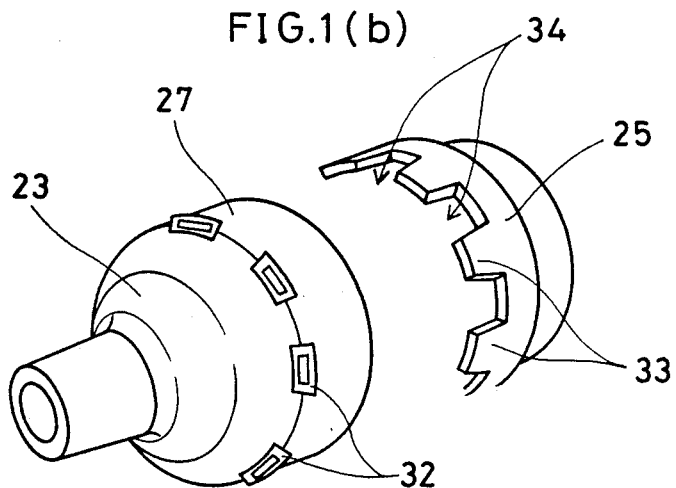

With reference to FIG. 1, a clutch 21 is interposed between a sun gear input drum 23 fitted on an intermediate shaft 22b, and a flange 24 fitted on an input shaft 22a. The clutch 21 is engaged and disengaged by a piston 26 inside a clutch cylinder 25, and the sun gear input drum 23 is fitted on the outer periphery of the clutch cylinder 25 to construct a band drum portion 27. A band brake 28 is arranged on the band drum portion 27 so as to be capable of contacting and separating from the band drum portion. Arranged on the outer side of the sun gear input drum 23 is a counterdrive gear 29 whose inner periphery is splined to a carrier CR and whose outer periphery is freely rotatably supported on a transaxle via a bearing 31.

As shown in (b) of FIG. 1, the sun gear input drum 23 is formed by punch pressing to include a plurality of fitting holes 32 at the boundary between the sun gear input shaft 23 and the band drum portion 27, and the clutch cylinder 25 is formed to include fingers 33 corresponding to the fitting holes 32. A clutch frictional engaging plate 35 is fitted on spline portions 34 between the fingers 33. By inserting the fingers 33 into corresponding ones of the fitting holes 32, the sun gear input drum 23 and the clutch cylinder 25 form a unitary rotating element, with the power of both of these components being transmitted by the fingers 33 and fitting holes 32. Centering of the band drum 27 is accomplished by finishing the inner peripheral surface of the band drum portion 27 and the outer peripheral surface of the clutch cylinder. Overall centering is performed by means of a bush 36 of the clutch drum 25.

By applying hydraulic pressure to a piston (not shown), the piston is caused to stroke so that the rod thereof tightens the band brake 28, which thereby engages the band drum portion 27. As a result, rotation of the sun gear input drum 23 and clutch cylinder 25 is stopped.

Figure 2:
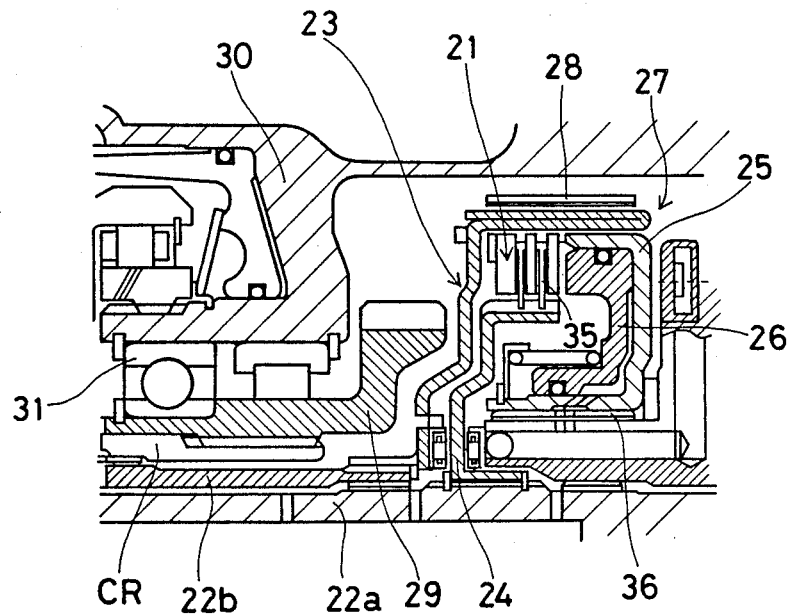
FIG. 2 is a sectional view illustrating a second embodiment of the present invention.
Figure 3A:
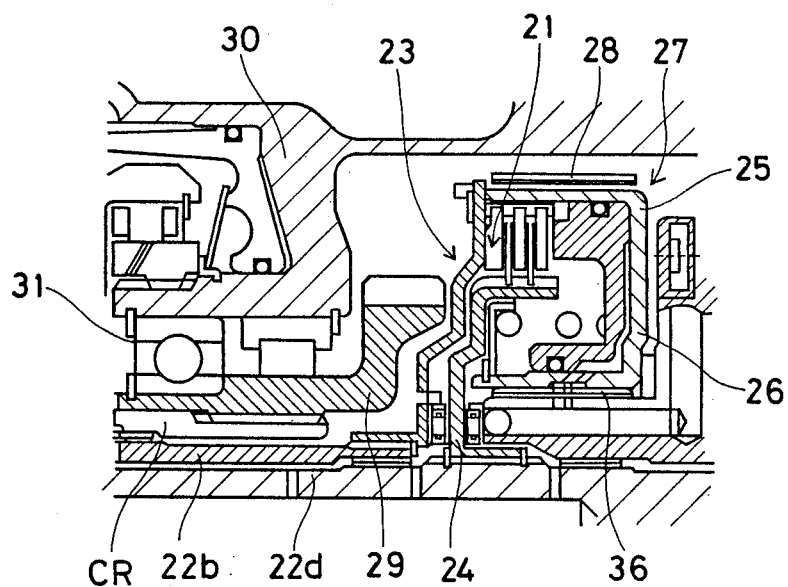
FIG. 3(a) and 3(b) illustrate a third embodiment of the present invention, in which (a) is a sectional view and (b) a perspective view.
Figure 3B:
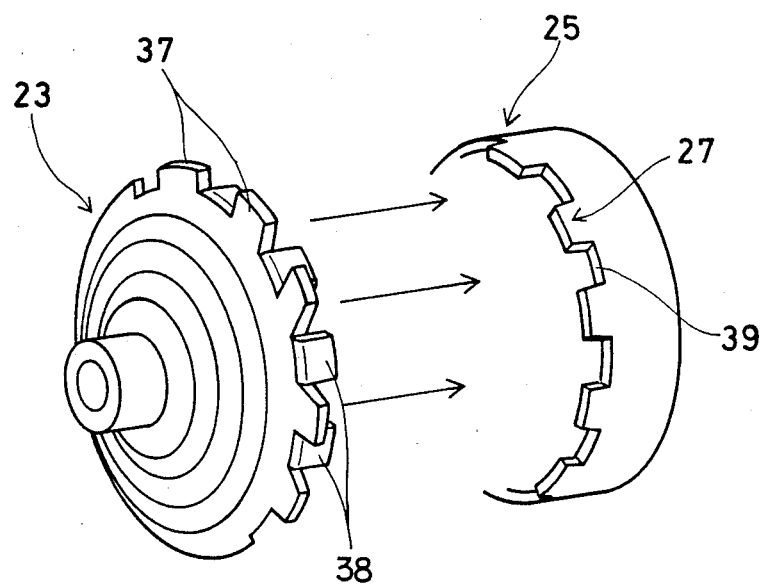
Figure 4A:
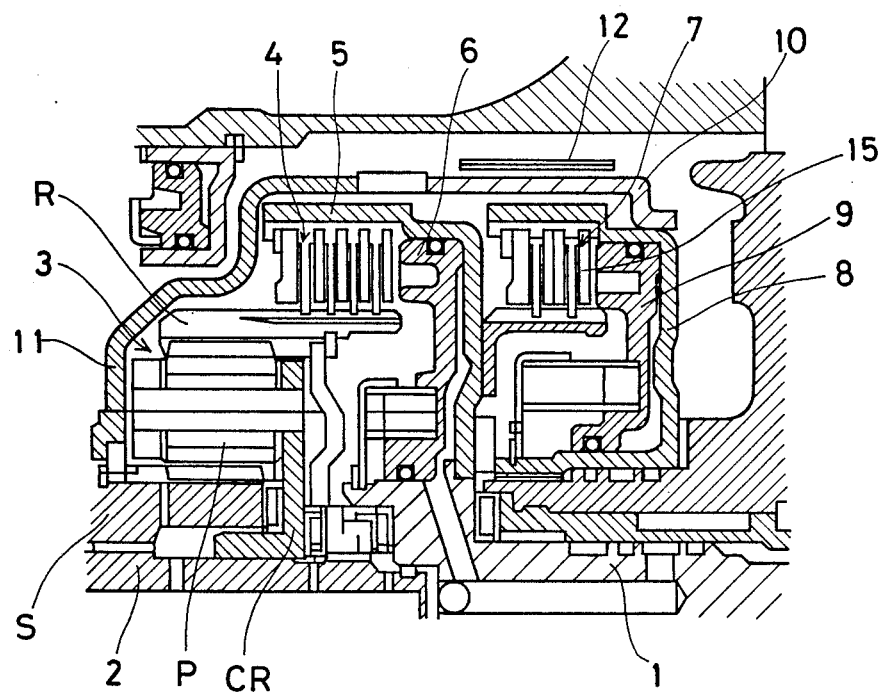
FIG. 4(a) and 4(b) illustrate the structure of a brake band drum of a conventional planetary gear-type transmission, in which (a) is a sectional view and (b) a perspective view of a clutch cylinder.
Figure 4B:
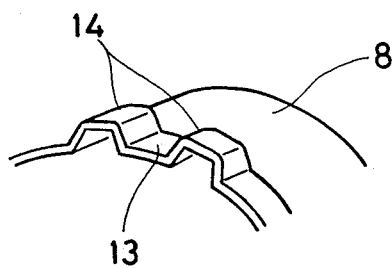

FIGS. 2 and 3 illustrate second and third embodiments of the present invention, in which portions similar to those of the first embodiment are designated by like reference characters and need not be described again.

The embodiment of FIG. 2 differs from that of FIG. 1 in that the sun gear input drum 23 comprises a thin plate and the band drum portion 27 to which the engaging pressure is applied is folded back on itself to form a double-layered structure. As a result, weight is reduced so that the drum is applicable to an automatic transmission having a low torque capacity.

Unlike the first and second embodiments described above, the band drum portion 27 in the third embodiment of FIG. 3 is formed on the outer peripheral surface of the clutch cylinder 25 and not on the sun gear input drum 23. In other words, the outer periphery of the sun gear input drum 23 is provided with a plurality of fingers 37 for power transmission and a plurality of plate retaining fingers 38 alternating with the fingers 37. The fingers 38 are bent substantially axially of the drum 23 and form spline portions for retaining the clutch frictional engaging plates 35. The clutch cylinder 25 is formed to include fitting notches 39 in which the power transmitting fingers 37 are fitted. In this embodiment, the sun gear input drum 23 and clutch cylinder 25 have few overlapping portions, so that a greater reduction in weight can be achieved.

The present invention is not limited to the foregoing embodiments and can be modified in various ways.

For example, though the band brake stops the rotation of the sun gear in the foregoing embodiments, an arrangement can be adopted in which any one member of the planetary gear mechanism is stopped.

Thus, in accordance with the invention, the brake band drum is formed by fitting the brake band drum and clutch cylinder together. This makes it possible to dispense with electron beam welding and reduce cost. Since there is no distortion caused by welding, piston operating irregularity due to distortion is eliminated and machining for preventing such operating irregularity is unnecessary. The entirety of the clutch cylinder is formed from a thin plate to lower cost further and reduce weight. Since a special drum for the brake band is unnecessary, an even greater reduction in weight and cost can be achieved.

What we claim is:

1. A brake drum for a planetary gear type automatic transmission comprising a clutch formed inside a press manufactured planetary gear input member coupled to a press-manufactured clutch cylinder and to one member of a planetary gear mechanism, said planetary gear input member having an outer peripheral surface formed to include an engaging surface of a band brake and an inner peripheral surface finished by machining for centering said clutch cylinder, said engaging surface having one of fitting holes or slots, and said clutch cylinder having projections fitted within said one of said fitting holes or slots for providing uniform movement between said clutch cylinder and said planetary gear input member.

2. The brake band drum according to claim 1, wherein said planetary gear input member comprises a thin plate formed by pressing, and said engaging surface of said band brake has a two-layered folded structure.

3. A brake band drum for a planetary gear type automatic transmission comprising a clutch formed inside a press-manufactured planetary gear input member coupled to a press-manufactured clutch cylinder and to one member of a planetary gear mechanism, a band brake being arranged on the outer peripheral side of said clutch cylinder or said planetary gear input member, an engaging surface of said band brake being provided by one of said clutch cylinder and said planetary gear input member, said engaging surface having one of fitting holes or slots, and one of said clutch cylinder and said planetary gear input member having projections fitted within said one of either of said fitting holes or slots for providing uniform movement between said clutch cylinder and said planetary gear input member, wherein said one of said clutch cylinder and said planetary gear input member having projections retains a frictional engaging plate between its projections.

* * * * *